US011200081B2

(12) United States Patent
Croteau et al.

(10) Patent No.: US 11,200,081 B2
(45) Date of Patent: Dec. 14, 2021

(54) SYSTEMS AND METHODS FOR TUNING CONTAINERS IN A HIGH AVAILABILITY ENVIRONMENT

(71) Applicant: ForgeRock, Inc., San Francisco, CA (US)

(72) Inventors: Beau Croteau, Bay Shore, NY (US); Robert Blue, Issaquah, WA (US); Jeremyah Corner, Renton, WA (US)

(73) Assignee: ForgeRock, Inc., San Francisco, CA (US)

( * ) Notice: Subject to any disclaimer, the term of this patent is extended or adjusted under 35 U.S.C. 154(b) by 217 days.

(21) Appl. No.: 16/659,553

(22) Filed: Oct. 21, 2019

(65) Prior Publication Data

US 2021/0117217 A1 Apr. 22, 2021

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01); *G06F 2009/45562* (2013.01)

(58) Field of Classification Search
CPC .............. G06F 9/45558; G06F 9/5077; G06F 2009/45562; G06F 2009/4557
See application file for complete search history.

(56) References Cited

U.S. PATENT DOCUMENTS

| 10,303,576 | B1* | 5/2019 | Seymour | G06F 11/3433 |
| 2015/0205708 | A1 | 7/2015 | Michelsen | |
| 2017/0295062 | A1 | 10/2017 | Tang | |
| 2021/0004253 | A1* | 1/2021 | Barnes | G06F 9/5005 |
| 2021/0072966 | A1* | 3/2021 | Zong | H04L 67/32 |

OTHER PUBLICATIONS

Amazon; AWS Elastic Beanstalk Developer Guide; Aug. 2019; https://web.archive.org/web/20190805110626/https://docs.aws.amazon.com/elasticbeanstalk/latest/dg/awseb-dg.pdf (Year: 2019).*

(Continued)

*Primary Examiner* — Dong U Kim
(74) *Attorney, Agent, or Firm* — Haynes Beffel & Wolfeld, LLP; Ernest J. Beffel, Jr.

(57) ABSTRACT

The disclosed technology teaches tuning containers in pods, in a high availability environment that runs two or more pods to implement a service, while the containers are running, including instrumenting a tunable container to communicate application metrics to a tuning engine that runs in a pod and maintains current configuration state information for the container. The tuning engine accesses the application metrics and a rule that specifies tuning of resource configuration for the container. The rule combines variables in the metrics to determine whether an update should be applied to the container. The tuning engine determines a new resource configuration for the tunable container and updates the configuration state information for the container according to the new configuration. An update manager detects updating of the configuration state information and performs a rolling update of instances of the tunable container in the pods that implement the service.

20 Claims, 6 Drawing Sheets

(56) References Cited

OTHER PUBLICATIONS

U.S. Appl. No. 16/579,740, Notice of Allowance dated Jun. 29, 2020, 18 pages.
"Configuring Vertical Pod Autoscaling", Kubernetes Engine, Google Cloud (https://cloud.google.com/kubernetes-engine/), Aug. 14, 2019, 8 pages.
Nilkin, "Kubernetes Deployment Dependencies", https://medium.com/google-cloud/kubernetes-deployment-dependencies-ef703e563956, Jul. 2, 2018, 21 pages.
"Vertical Pod Autoscaling", Kubernetes Engine, https://cloud.google.com/kubernetes-engine/docs/concepts/verticalpodautoscaler), Aug. 29, 2019, 8 pages.
Sakimura et al., "OpenID Connect Dynamic Client Registration 1.0 incorporating errata set 1", https://openid.net/specs/openid-connect-registration-1_0.html, Oct. 1, 2019, 19 pages.
Jayanandana, "Enable Rolling updates in Kubernetes with Zero downtime", https://medium.com/platformer-blog/enable-rolling-updates-in-kubernetes-with-zero-downtime-31d7ec388c81, Sep. 27, 2018, 6 pages.
"FAQ: IDM/OpenIDM performance and tuning", https://backstage.forgerock.com/knowledge/kb/article/a32504603, Jun. 26, 2019, 4 pages.
Cichonski et al., "Computer Security Incident Handling Guide", National Institute of Standards and Technology, U.S. Department of Commerce, Special Publication 800-61, Revision 2, http://dx.doi.org/10.6028/NIST.SP.800-61r2, Gaithersburg, MD, 2012, 79 pages.
"Hardening your cluster's security", Kubernetes Engine, (https://cloud.google.com/kubernetes-engine/docs/concepts/security-overview), Jul. 2019, 10 pages.
Dempsey, et al., "Information Security Continuous Monitoring (ISCM) for Federal Information Systems and Organizations", NIST National Institute of Standards and Technology, U.S. Dept. of Commerce, NIST Special Publication 800-137, 2011, Gaithersburg, MD, 80 pages.

\* cited by examiner

SYSTEMS AND METHODS FOR TUNING CONTAINERS IN A HIGH AVAILABILITY ENVIRONMENT

RELATED APPLICATION

This application is related to U.S. patent application Ser. No. 16/579,740, entitled "SECURE SERVICE ISOLATION BETWEEN INSTANCES OF CLOUD PRODUCTS USING A SaaS MODEL," filed on 23 Sep. 2019. The related application is incorporated by reference for all purposes.

FIELD OF THE TECHNOLOGY DISCLOSED

The disclosed technology relates generally to automatically updating an application in a SaaS environment with no knowledge or interaction with the user of the services provided by the environment. More specifically, the technology discloses tuning containers in pods, in a high availability environment that runs two or more pods to implement a service, while the containers are running.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Different customers that consume services delivered via a software-as-a-service model in a cloud-based environment need to be able to update and customize configurable variables and objects responsive to requests for specific functionality, to ensure smooth performance and to maximize throughput while minimizing response times. In the past, changes to customer applications have resulted in discrepancies between versions among users running in different containers in pods. Consequently, a need exists for tuning containers in pods, in a high availability environment that runs two or more pods to implement a service, while the containers are running.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Rich applications provide modern services such as integrated and secure registration, account recovery and modern multi-factor authentication, as well as additional services. In a multi-tenant service domain, each customer's environment is distinct and dedicated to that tenant.

A union of a set of services running in containers in pods in a high availability environment provides a software as a service (SaaS) application. This SaaS can be made available for multiple tenants in the cloud, simultaneously. Customers that consume services delivered via a SaaS model in a cloud-based environment need to be able to customize and update variables responsive to specific processing demands, with common goals being to maximize throughput while minimizing response times, as well as offering smooth performance to their end users. The ability to update variable values and indexing of fields enhances the processing speed. Customization can result in discrepancies between variables and indexes among services running in different instances in containers in pods, due to different updates being applied to a customer's applications over time.

This disclosed white box approach uses application metrics measured from within an application instance in conjunction with rules, for automatically determining what variables and indexes need to be updated. The disclosed technology minimizes the time during which two instances of an application differ by tuning containers in pods, in a high availability environment that runs two or more pods to implement a service, while the containers are running. The words customer and tenant are used interchangeably in this document.

The next section describes architecture for tuning containers in pods, in a high availability environment that runs two or more pods to implement a service, while the containers are running.

Architecture

Figure 1:
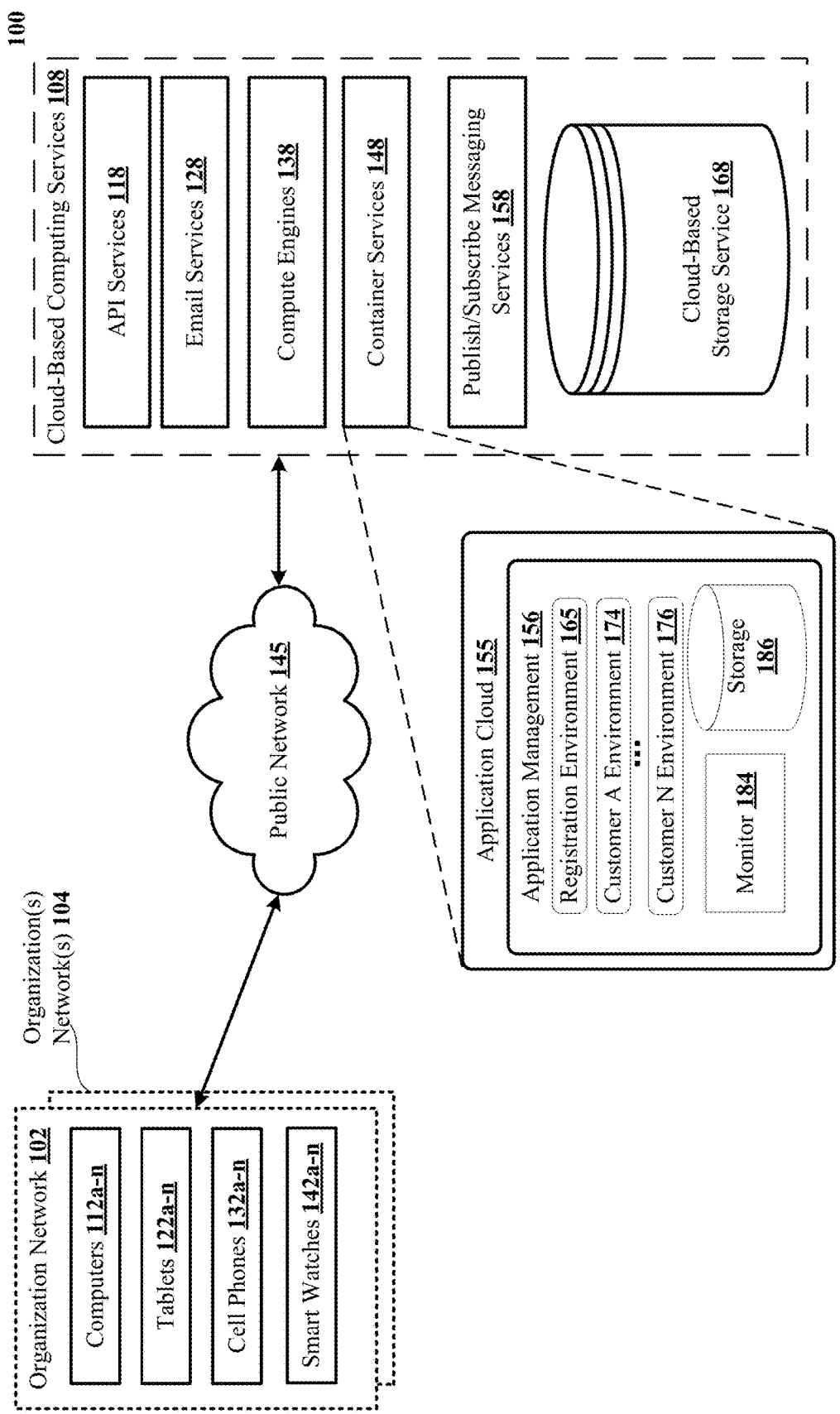
FIG. 1 shows an architectural level schematic of a system for tuning containers in pods, in a high availability environment that runs two or more pods to implement a service, while the containers are running, for a service implemented on a cloud-based computing cluster, according to one embodiment of the disclosed technology.

FIG. 1 shows an architectural level schematic of a system 100 for tuning containers in pods, in a high availability environment that runs two or more pods to implement a service, while the containers are running, for a service implemented on a cloud-based computing cluster. Because FIG. 1 is an architectural diagram, certain details are intentionally omitted to improve clarity of the description. The discussion of FIG. 1 is organized as follows. First, the elements of the figure are described, followed by their interconnections. Then, the use of the elements in the system are described in greater detail.

System 100 includes organization network 102, application cloud 155 with cloud-based computing services 108 and public network 145. System 100 can include multiple organization networks 104 for multiple organizations. Application cloud 155 includes customer environments hosted on behalf of specific customers of a SaaS application. Each customer's environment interacts with an organization network 102. Organization network 102 includes computers 112a-n, tablets 122a-n, cell phones 132a-n and smart watches 142a-n. In another organization network, organization users may utilize additional devices. Cloud-based computing services 108 includes API services 118, web email services 128, compute engines 138, container services 148 and publish/subscribe messaging services 158 which support event-driven, asynchronous communication among decoupled applications, such as microservices and serverless architectures. Also includes is cloud-based storage service 168. Cloud-based computing services 108 can include additional apps and services as well. Application cloud 155 connects to organization network 102 and cloud-based computing services 108 via public network 145.

Application cloud 155 is a service that hosts an application for use by multiple customers, which is implemented using container services 148 as indicated via the dotted lines. Application cloud 155 includes pre-configuration for building rich applications with integrated and secure registration, account recovery, and multifactor authentication. Application cloud 155 with application management 156 includes registration environment 165 for registering new consumer environments and managing the overall health of the services, and also includes consumer A environment 174 through consumer N environment 176. Multiple different consumers can have environments within a single application cloud 155. In another implementation, the setup can be different. Consumer data is stored within the customer environment. It is not co-mingled with other customers' data and can be accessed only by the customer.

Continuing further with the description of FIG. 1, system 100 can be used in the delivery of many kinds of services as cloud-based computing services 108: point to point streaming services, hosted services, cloud applications, cloud stores, cloud collaboration and messaging platforms, and cloud customer relationship management (CRM) platforms. The services can include peer-to-peer file sharing (P2P) via protocols for portal traffic such as BitTorrent (BT), user data protocol (UDP) streaming and file transfer protocol (FTP); voice, video and messaging multimedia communication sessions such as instant message over Internet Protocol (IP) and mobile phone calling over LTE (VoLTE) via the Session Initiation Protocol (SIP) and Skype. The services can handle Internet traffic, cloud application data, and generic routing encapsulation (GRE) data. A network service or application can be web-based (e.g., accessed via a uniform resource locator (URL)) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common cloud-based services today include Salesforce.com™ Box™, Dropbox™, Google Apps™, Amazon AWS™, Microsoft Office 365™, Workday™ Oracle on Demand™, Taleo™, Yammer™ Jive™ and Concur™.

In the interconnection of the elements of system 100, public network 145 couples computers 112a-n, tablets 122a-n, cell phones 132a-n, smart watches 142a-n, API services 118, email services 128, compute engines 138, container services 148 with application cloud 155, publish/subscribe messaging services 158 and cloud-based storage service 168 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP and/or JMS. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1, application cloud 155 includes monitor 184 and storage 186 which can include one or more computers and computer systems coupled in communication with one another. Customer environments can emit health related data to monitor 184 and storage 186. They can also be one or more virtual computing and/or storage resources. Monitor 184 can be utilized to determine availability of customer environments and can include infrastructure level monitoring and basic application level metrics, as well as configuration controls for organization administrators of customers. For example, monitor 184 can utilize one or more Google Compute engines or Amazon EC2 instances and storage 186 can be Google Cloud Platform datastore or Amazon S3™ storage. The engines or system components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection. For example, organization network 102 can be coupled via network(s) 145 (e.g., the Internet), application cloud 155 can be coupled via a direct network link and cloud-based computing services 108 can be coupled by yet a different network connection.

Storage 186 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud-based computing services 108. Non-structured data, such as free text, can also be provided by, and targeted back to cloud-based computing services 108. Both structured and non-structured data are capable of being aggregated by application cloud 155. For instance, assembled metadata can be stored in a semi-structured data format like a JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects can be stored in a schema-less or NoSQL key-value metadata store like Apache Cassandra™, Google's BigTable™, HBase™, Voldemort™, CouchDB™, MongoDB™ Redis™, Riak™, Neo4j™, etc.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™ Apache Spark™, Apache Kafka™, Apache Flink™, Truviso™, IBM Info-Sphere™, Borealis™ and Yahoo! S4™.

Figure 2:
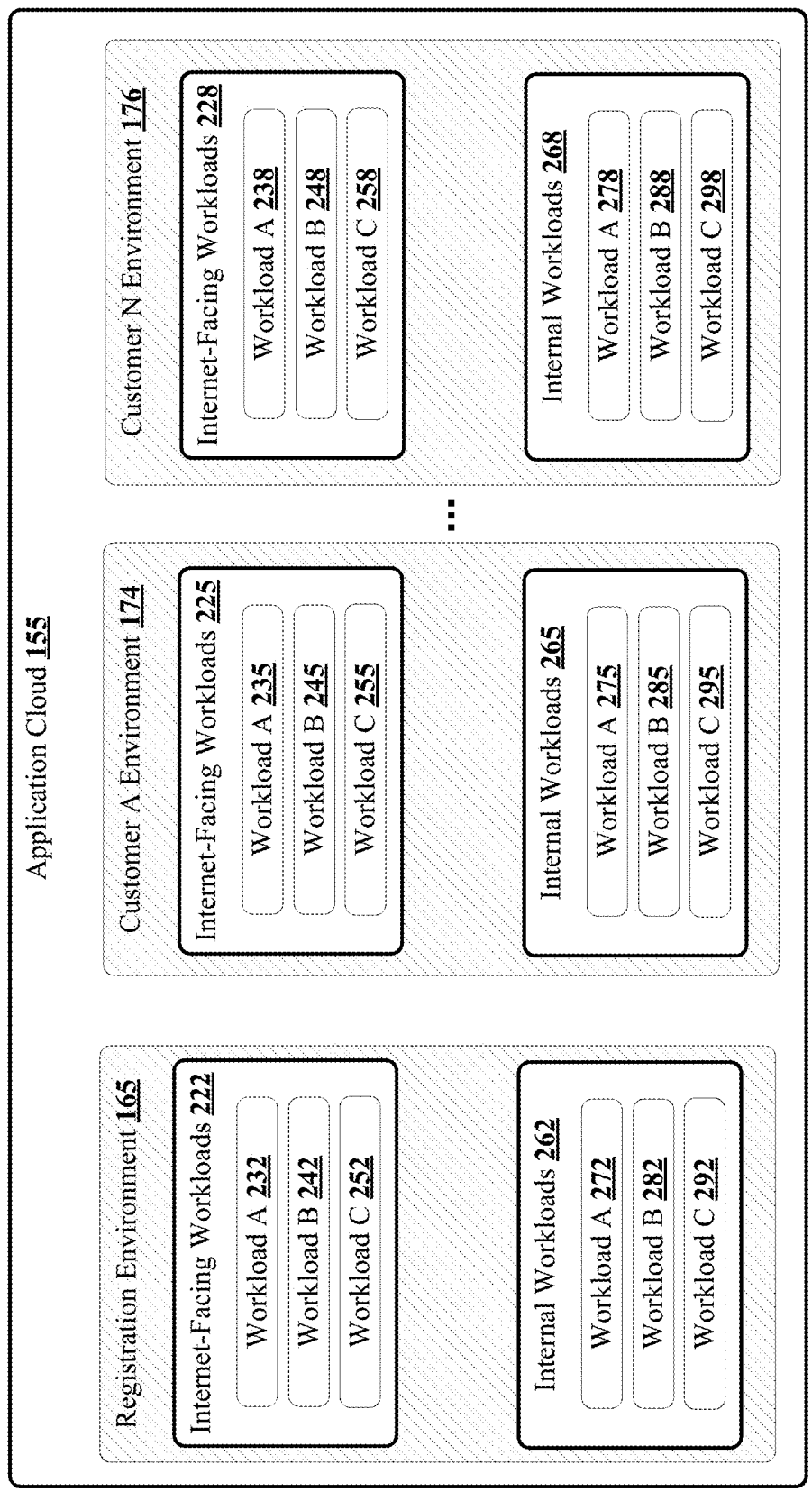
FIG. 2 shows a simplified block diagram of application cloud 155 usable for tuning containers in pods, in a high availability environment that runs two or more pods to implement a service, while the containers are running, in a high availability environment.

FIG. 2 shows a simplified block diagram of application cloud 155 usable for tuning containers in pods, in a high availability environment that runs two or more pods to implement a service, while the containers are running, in a high availability environment, with registration environment 165 and customer A environment 174 through customer N environment 176. Application cloud 155 utilizes a suite of cloud computing services, alongside a set of management tools, that provides a series of modular cloud services including computing, data storage and data analytics. In one case, application cloud 155 is implemented using Google Cloud Platform (GCP) that provides infrastructure as a service, platform as a service, and serverless computing environments. GCP Platform is a part of Google Cloud, which includes the GCP public cloud infrastructure, as well as G Suite, enterprise versions of Android and Chrome OS, and application programming interfaces (APIs) for machine learning and enterprise mapping services. At the physical level, GCP provides encryption of data at rest. Data is encrypted when written to a hard drive and decrypted when read. In other cases, application cloud 155 could be implemented using Amazon Web Services (AWS) or Microsoft Azure Virtual Machines. While it is understood that application cloud 155 could be implemented via an AWS or Azure VM platform, the following description of the disclosed technology utilizes a GCP cloud-based computing cluster for an application instance using a SaaS model. Inside the cluster are nodes; each node is a virtual or physical machine inside the cluster; and each node can contain multiple pods and a pod can contain one or more containers. The disclosed technology includes tuning the containers in the pods, in the high availability environment that runs two or more pods to implement a service, while the containers are running.

Continuing the description of the block diagram of FIG. 2, application cloud 155 is hosted on GCP and deploys registration environment 165 and customer A environment 174 through customer N environment 176 as separate projects in a high availability environment that runs two or more pods to implement a service. In one implementation, the projects are implemented using Kubernetes (K8S), an open-source container-orchestration system for automating application deployment, scaling, and management, with K8S usable to span an application over thousands of servers, while being managed as a single unit. Outside apps have no knowledge of an app running inside the orchestration layer container. In another implementation, container services 148 can be implemented using a different technology such as virtual machines (VM) on compute engines. This description will use K8S as an example for projects. K8S works with container tools, including Docker, and provides a partitioning of the resources it manages into non-overlapping sets called namespaces. A Docker container running on a physical host is a lightweight self-contained environment sharing the host operating system, and with its own processor address space, memory address space and networking address space with network layer resources including IP addresses and transport layer resources including TCP port numbers.

Further continuing the description of the block diagram of FIG. 2, registration environment 165 includes internet-facing workloads 222 implemented in distinct K8S namespaces, with workload A 232, workload B 242 and workload C 252 each as a separate Docker container. Similarly, internal workloads 262 are implemented in a distinct K8S namespace; and workload A 272, workload B 282 and workload C 292 each utilize a separate container runtime, such as Docker or a 'rkt' container engine as a workload that implements the running application, libraries, and their dependencies.

The scheduling unit for K8S is a pod for grouping containerized components, with a pod including one or more containers that can share resources. Each pod is assigned a unique Pod IP address within the cluster, which allows applications to use ports without the risk of conflict. Within the pod, containers can reference each other on localhost, and containers can use a reference to a service, which holds a reference to the target pod at the specific Pod IP address, to address another container within another pod. Continuing, a pod can define a volume, such as a local disk directory or a network disk and expose it to the containers in the pod. Pods can be managed manually through the Kubernetes API, or their management can be delegated to a controller. Such volumes include the basis for the K8S features of 'Config-Maps' for providing access to configuration through the filesystem visible to the container, and 'Secrets' for providing access to credentials needed to access remote resources securely, by providing those credentials on the filesystem visible only to authorized containers.

Continuing with the description of FIG. 2, application cloud 155 sets up trust zones to create a strong multi-layered defense against data breaches. Of note, each customer's environment comprises a dedicated trust zone that shares no code, data, or identities with other customers' environments. Customer A environment 174 includes internet-facing workloads 225 implemented in distinct K8S namespaces, with workload A 235, workload B 245 and workload C 255 each as a separate Docker container. Similarly, internal workloads 265 are implemented in a distinct K8S namespace; and workload A 275, workload B 285 and workload C 295 each utilize a separate Docker container. Similarly, customer N environment 176 includes internet-facing workloads 228 implemented in distinct K8S namespaces, with workload A 238, workload B 248 and workload C 258 each as a separate Docker container. Similarly, internal workloads 265 are implemented in a distinct K8S namespace; and workload A 275, workload B 285 and workload C 295 each utilize a separate Docker container. Only service-dedicated user accounts can log into application cloud 155 and each customer environment is self-sufficient and sovereign and cannot access resources in the other environments. Even these environments are additionally segmented. Workloads at greater risk, such as those that accept input from Internet-based clients, are isolated to protect those performing higher-privileged operations. Every workload is encapsulated as a dedicated, hardened Docker container.

Figure 3:
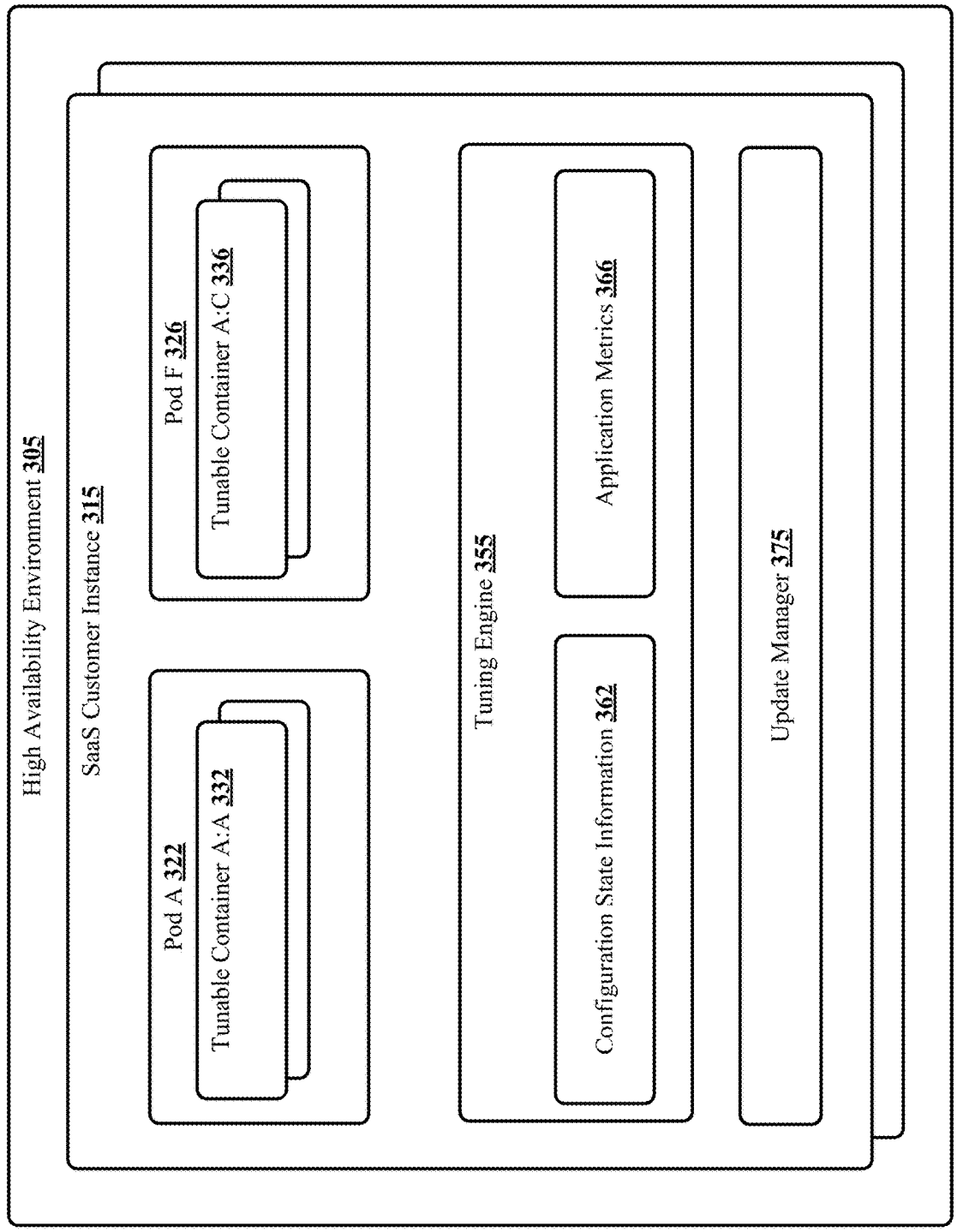
FIG. 3 shows a block diagram for a high availability environment with tunable containers in two or more pods to implement a service, while the containers are running, in cloud-based computing services.

FIG. 3 shows a block diagram 300 for high availability environment 305 with tunable containers in two or more pods to implement a service, while the containers are running. Because FIG. 3 is a block diagram, certain details are intentionally omitted to improve clarity of the description.

SaaS customer instance 315, in high availability environment 305, is delivered via pod A 322 through pod F 326. Each pod includes multiple containers: tunable container A:A 332 through tunable container A:C 336. Multiple distinct SaaS customer instances can co-exist in high availability environment 305, for multiple customers, with each customer's environment comprising a dedicated trust zone that shares no code, data or identities with other customers' environments, as described earlier. In some cases, multiple SaaS customer instances 315 are utilized by a single customer. For example, a large bank may choose to have a distinct application instance for each region of the country.

Continuing the description of diagram 300, tuning engine 355 communicates K8S level resources such as node count, memory utilization and CPU and app level resources such as JVM heap usage, authentication count, active sessions, as well as pod-level resources such as temp files and external processes running with the pod. Tuning engine 355 includes a configuration broker that accesses configuration state information 362. In one implementation, the configuration state information is stored as a Kubernetes configuration map, as a YAML file. In another case, the configuration state information can be stored as a deployment resource bundle in Helm charts as inputs for a deployment controller. The state information defines the state of the tenant to be deployed. Tunable container A:A 332 through tunable container A:C 336 are each instrumented to communicate application metrics 366 to tuning engine 355, which utilizes the application metrics 355 and a rule that specifies tuning of resource configuration for the tunable container A:A 332. The rule combines variables in application metrics 366 to determine whether a tuning update should be applied to the tunable container A:A 332. Responsive to applying the rule, tuning engine 355 determines a new resource configuration for tunable container A:A 332 and updates configuration state information 362 for tunable container A:A 332 according to the new resource configuration. Containers can be instrumented to scrape application metrics at configurable time intervals. In one implementation, the instrumentation is implemented in a monitoring app container deployed to each app container; in another case the container monitoring process is included internally for the container. Container monitoring can utilize an agent per pod, for containers that share a namespace. In some cases, a monitoring agent for each host collects metrics by observing all system calls traversing the kernel. In some implementations, a software application, such as Prometheus, which records real-time metrics in a time series database using an http pull model, can be used to display surfaced internal metrics.

Further describing block diagram 300, update manager 375 detects that configuration state information 362 has been updated and performs a rolling update of instances of tunable container A:A 332 in pod A 322 through pod F 326 in the high availability environment 305 that implement the service. The same process applies to tunable container A:A 332 through tunable container A:C 336, with update of a single tunable container A:A 332 described for readability. Tuning engine 355 and update manager 375 can be deployed as a single engine with the combined in one implementation. In other cases, tuning engine 355 and update manager 375 run in distinct containers.

Figure 4:
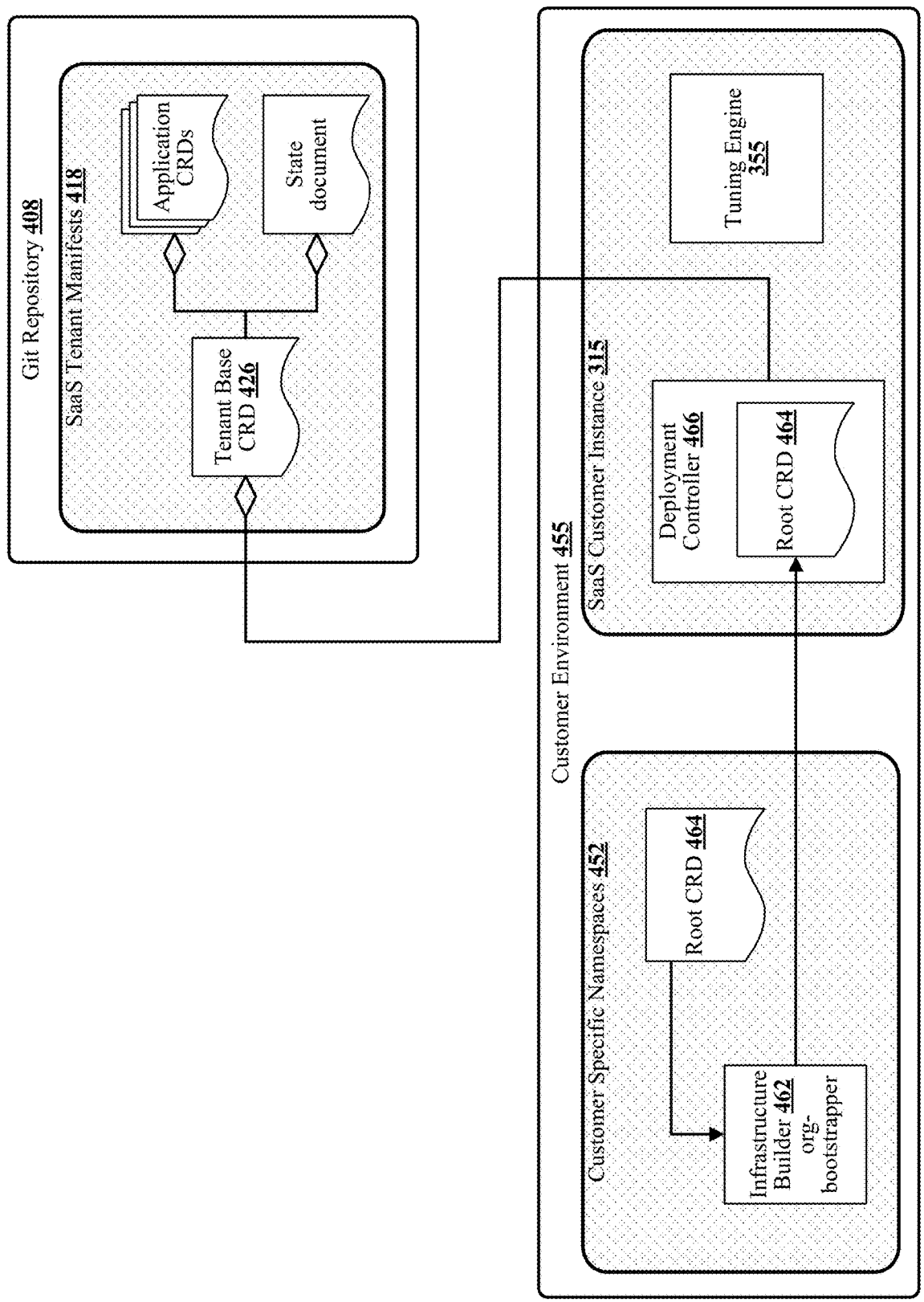
FIG. 4 shows an example block diagram of components that a disclosed update manager uses for performing rolling updates of instances of tunable containers, in cloud-based computing services.

An application instance that uses a SaaS model for delivering services is implemented on cloud-based computing services, as described in related U.S. patent application Ser. No. 16/579,740, entitled "SECURE SERVICE ISOLATION BETWEEN INSTANCES OF CLOUD PRODUCTS USING A SaaS MODEL," which is included herein in full, by reference. FIG. 4 shows an example block diagram utilizable by update manager 375 for performing the disclosed rolling updates of instances of tunable containers. In summary, when a new customer registers for service via a client app or customer website, a SaaS worker requests a customer instance and GCP creates customer environment 455, instantiating a new vanilla GCP K8S project, with customer specific namespaces 452, provisioning the cluster to hold the default set of pods, services and deployments used by the cluster. After customer environment 455 is launched, infrastructure builder, aka bootstrapper 462 reads root customer resources definition (CRD) 464 with the project ID, tenant name and branch information. In one implementation, a YAML file is utilized to declare parameters that define the customer organization to be used for deployment and state monitoring. In another implementation, configuration parameters can be specified using a different format.

Continuing with the description of diagram 400, infrastructure builder 462 creates a dedicated K8S service account and creates namespaces, creating a dedicated GCP service account for each namespace and granting the needed namespace-scoped roles. Infrastructure builder 462 deploys root CRD 464 for SaaS customer instance 315. Tuning engine 355 initializes the stack and remaining workloads, launches the SaaS customer instance 315 and manages service delivery, running under sovereign control of a customer organization, maintaining the state of the customer environment. One implementation of deployment controller 466 utilizes Argo CD, a declarative continuous delivery tool implemented as a Kubernetes controller which continuously monitors running applications and compares the current, live state against the desired target state, as specified in the Git repository, which has a distributed version-control system for tracking changes. A deployed application whose live state deviates from the target state is considered to be out of sync. Any modifications made to the desired target state in the Git repository can be automatically applied and reflected in the specified target environments. Deployment controller 466 references tenant base CRD 426 in SaaS tenant manifests 418. Application CRDs and a state document that specifies the capabilities of tuning engine 355 jointly form the tenant base CRD 426, in one implementation. When update manager 375 detects that the configuration state information has been updated, update manager 375 performs a rolling update of instances of the tunable container in the pods in the high availability environment that implement the service. Update manager 375 maintains a configurable minimum number of instances of the tunable container in the pods and deletes existing pods that use configuration state information that has not been updated. Update manager 375 can utilize a Kubernetes readiness probe to ensure that new instances are ready to take on workload before deleting existing instances.

Two goals of particular interest for applications running in a high availability environment in the cloud are ensuring smoothly performing access and management services and maximizing throughput while minimizing response times as described earlier. Next, we describe two use case examples that utilize the disclosed method of tuning containers in pods, while the containers are running.

Use Case Examples

In a first example, application metrics 366 are usable for analyzing performance and throughput during startup conditions when a new service is initialized and begins to receive registrations and authentications. The disclosed technology includes instrumenting a tunable container to communicate the application metrics 366 to tuning engine 355. In one example, application metrics 366 include counts of registrations and counts of authentications. In this example, metrics that measure the counts of registrations and counts of authentications as a rolling sum over one minute, five minute, and fifteen minute periods are available inside the disclosed environment, which can be referred to as a white box approach, instead of a black box approach in which only external signals are available for decision making.

For this example, a tunable container for an application includes a configurable variable: 'maximum number of user entries cached' which is a Java parameter that gets read at startup. Tuning of this variable using the described rolling update of instances of tunable containers in pods in the high availability environment can contribute to achieving the goals described earlier. A rule for determining the setting for the 'maximum number of user entries cached' variable utilizes the registration count and the authentication count metrics. A first rule example is: if the number of registrations in fifteen minutes is less than five times the number of authentications, then increase the 'maximum number of user entries cached' to two times the current value of 'maximum number of user entries cached'. A second example rule for considering what value to set for the variable, 'maximum number of user entries caches' is: if the number of registrations in fifteen minutes is greater than the number of authentications, then decrease the value of the variable, 'maximum number of user entries cached' to one half the current value of 'maximum number of user entries cached'. Intuitively, if the 'maximum number of user entries cached' gets tuned from a value of 10,000 to a value of 20,000 during startup, then many more (twice as many) customers can be loaded into the system cache. Later in time, if the number of registrations slows down, decrease the size of the cache. That is, when the number of registrations logged, as stored in application metrics 366, during a fifteen minute time period exceeds the number of authentications logged during the same time period, then tuning the container so that the value of the 'maximum number of user entries cached' variable returns to a value of 10,000 results in the allocation of less memory for the cache, resulting in more memory available for processing functionality, which may improve response times.

The disclosed technology that supports tuning containers in pods, in a high availability environment that runs two or more pods to implement a service, while the containers are running, utilizes metrics and rules for tuning containers. While this is a single example for particular configurable state information and rules, one skilled in the art can envision many additional situations in which tuning a container to constrain variables based on application metrics 366 can improve performance of an application instance and even add new functionality for customers. Rules can codify best practices derived as a result of automatically monitoring metrics associated with customers' applications. Such rules are fundamentally different from rules derived from subjective judgment of human operators applied in an ad hoc setting. In a distinct example, if internal metrics enumerating the number of temp files being created reveal that a service is creating a large number of temporary files locally for image manipulation, tuning can be utilized for increasing the number of service instances running the app which is executing image manipulation, to enhance app throughput.

Additional examples of resources that can be updated in the resource configuration for the tunable container include increasing the number of concurrent connections allowed and distinctly increasing the number of work threads in a pool whose queue is getting larger. In another instance, when application metrics 366 show that performance is not as good as expected, the number of open files allowed resource can be updated, to accommodate a demand for client connections. Soft and hard limits can be updated based on rules associated with a determined phase of operation. For a production system, changes to JVM settings can enable high performance for phases of operation when demand is determined to increase. In some cases, tuning engine 355 can apply application metrics 366 and rules related to benchmark testing, troubleshooting performance issues and improving reconciliation performance for tuning an application's connection pool size resource and updating the configuration state information.

In another use case for tuning containers, the disclosed tuning update makes it feasible to add an index associated with a field whose count of field lookups occurring during a configurable time period is greater than a configurable percent of a total count of field lookups during the configurable time period.

Indexes take up both memory and disk space, so adding an index comes with a cost. As such, indexing every single field and object would result in diminishing returns rather quickly. Instead a plausible logic is to index common fields, as well as frequently used fields. To determine frequently used fields, requests can be tracked during rolling windows of time.

In one example application, customers have the option of adding custom attributes to users. In a specific use case, a customer adds 'account number' field that the user may use to login instead of using the 'username' field. That logic can be applied to the customer application programmatically, but a directory services app would potentially not be aware of the change. This would result in a large increase in the number of lookups of 'account number' because of increased reconciling of 'account number' and password pairs.

Continuing with the indexing use case example, if the developer knows which fields of the JSON values will be queried for by the client applications, they can optimize the index and specify the JSON fields that are indexed, by creating a new custom schema provider for the JSON query. They can choose to overwrite the default JSON query matching rules, and this will affect all JSON attributes, or they can choose to create a new rule (with a new name and object identifier). In this example, the custom schema provider overwrites the default 'caseIgnoreJsonQueryMatch', and only indexes the JSON fields '_id' and 'custom Attributes' with its subfields. By default, the server indexes each field of all JSON values. If the values are large and complex, indexing will result in many disk I/O operations, possibly impacting performance for write operations. If the developer knows which fields of the JSON values will be queried for by the client applications, they can optimize the index and specify the JSON fields that are indexed, by creating a new custom schema provider for the JSON query. The developer can choose to overwrite the default JSON query matching rules, as illustrated next, and this will affect all JSON attributes, or they can choose to create a new rule with a new name and object identifier.

In the following example, the custom schema provider overwrites the default caseIgnoreJsonQueryMatch, and only indexes the JSON fields '_id' and 'custom Attributes' with its subfields. On start, index 'userName #' is the default login field. A first rule to be implemented relative to indexing fields: 'if the number of lookups of X in 15 minutes is greater than fifty percent of all lookups and X doesn't have an index, then index this field' via the following transaction. The percent of all lookups can be configurable in some implementations.

```
$ dsconfig -h localhost -p 4444 \
    -D "cn=Directory Manager" -w secret12 -X -n \
    create-schema-provider --provider-name "Json Schema" \
    --type json-schema --set enabled:true \
    --set case-sensitive-strings:false \
    --set ignore-white-space:true \
    --set matching-rule-name:caseIgnoreJsonQueryMatch \
    --set matching-rule-oid:1.3.6.1.4.1.36733.2.1.4.1 \
    --set indexed-field:_id \
    --set "indexed-field:customAttributes/X/**"/**"
```

A second related rule for indexing fields: 'if number of lookups of X in 15 minutes is less than five percent of all lookups and X has an index, then remove the index from this field. As with use case one, while this is a single example for custom attributes and rules, one skilled in the art can envision many additional situations in which tuning a container to modify which fields include indexes, based on application metrics 366 can improve performance of an application instance.

Figure 5:
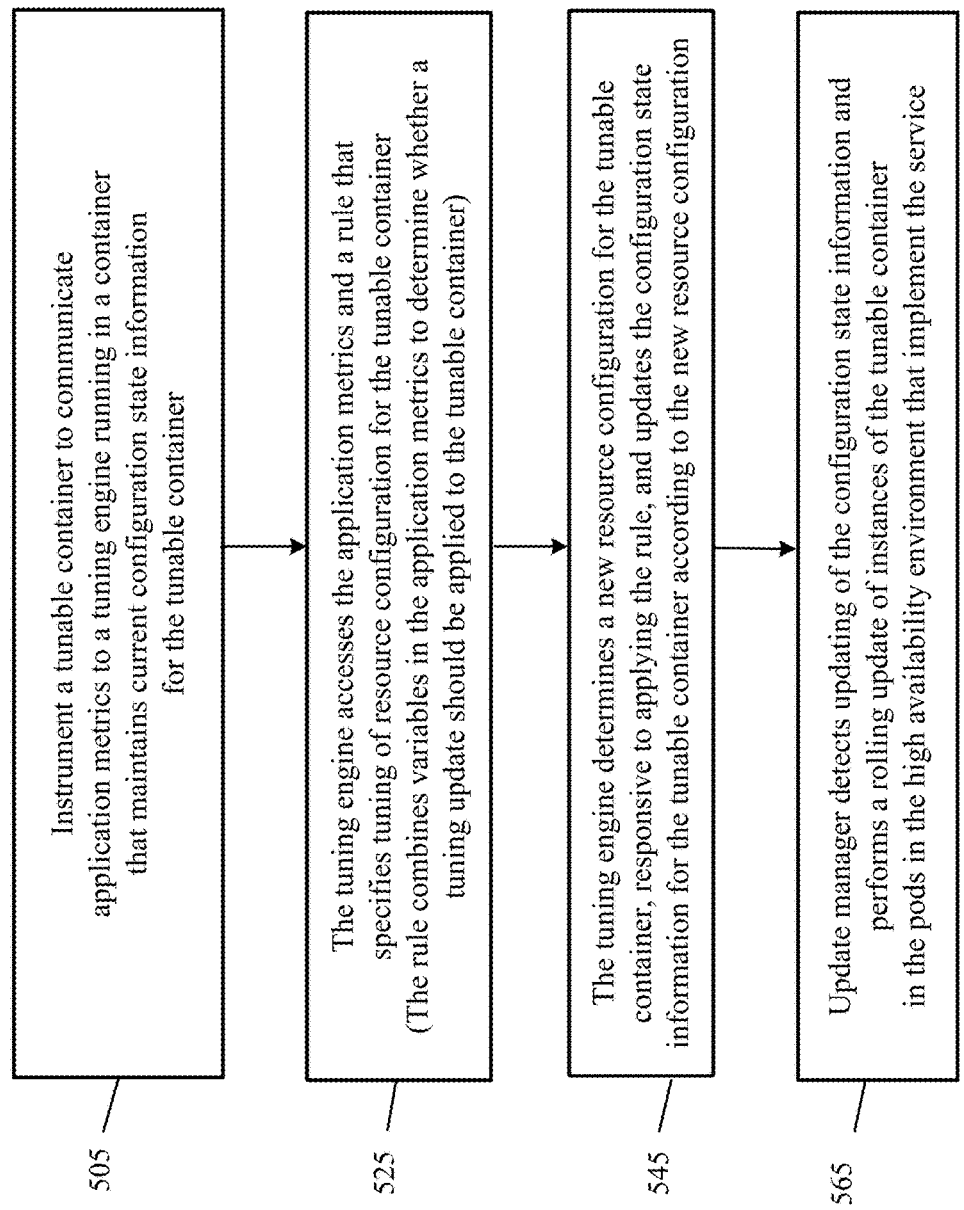
FIG. 5 shows a flowchart of steps utilized for tuning containers in pods, in a high availability environment that runs two or more pods to implement a service, while the containers are running, on cloud-based computing services.

FIG. 5 shows a flowchart 500 of steps utilized for of tuning containers in pods, in a high availability environment that runs two or more pods to implement a service, while the containers are running. Step 505 includes instrumenting a tunable container to communicate application metrics to a tuning engine running in a container that maintains current configuration state information for the tunable container. Step 525 includes the tuning engine accessing the application metrics and a rule that specifies tuning of resource configuration for the tunable container, where the rule combines a plurality of variables in the application metrics to determine whether a tuning update should be applied to the tunable container.

Step 545 includes the tuning engine, responsive to applying the rule, determining a new resource configuration for the tunable container and updating the configuration state information for the tunable container according to the new resource configuration.

For step 565, an update manager detects updating of the configuration state information and performs a rolling update of instances of the tunable container in the pods in the high availability environment that implement the service.

Other implementations may perform the actions in different orders and/or with different, fewer or additional actions than those illustrated in FIG. 5. Multiple actions can be combined in some implementations.

Computer System

Figure 6:
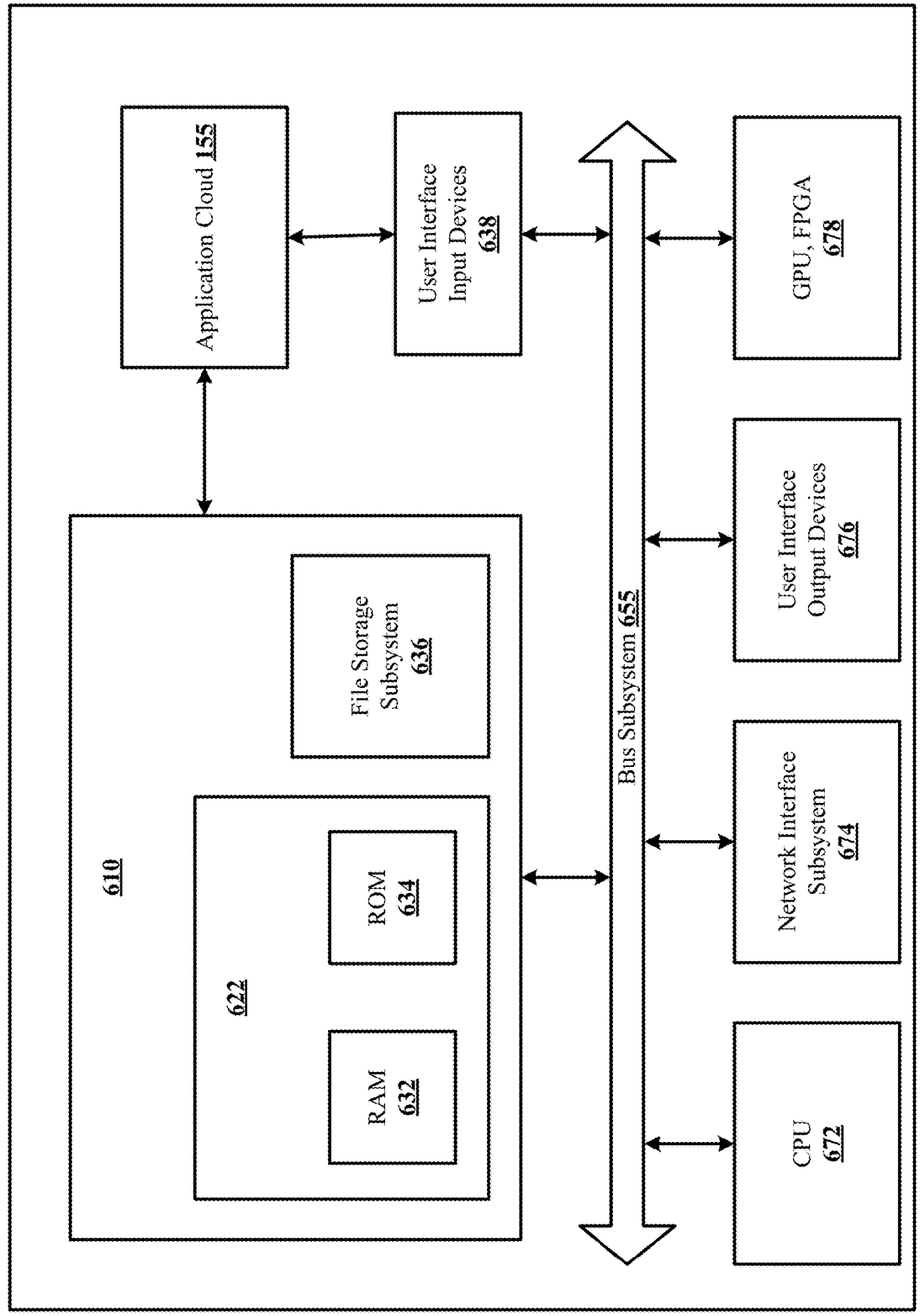
FIG. 6 is a simplified block diagram of a computer system that can be used for tuning containers in pods, in a high availability environment that runs two or more pods to implement a service, while the containers are running, for a service implemented on a cloud-based computing cluster, according to one embodiment of the disclosed technology.

FIG. 6 is a simplified block diagram of a computer system 600 that can be used for tuning containers in pods, in a high availability environment that runs two or more pods to implement a service, while the containers are running in a project implemented on a cloud-based computing service. Computer system 600 includes at least one central processing unit (CPU) 672 that communicates with a number of peripheral devices via bus subsystem 655, and Application cloud 155 for providing network security services described herein. These peripheral devices can include a storage subsystem 610 including, for example, memory devices and a file storage subsystem 636, user interface input devices 638, user interface output devices 676, and a network interface subsystem 674. The input and output devices allow user interaction with computer system 600. Network interface subsystem 674 provides an interface to outside networks, including an interface to corresponding interface devices in other computer systems. In one implementation, application cloud 155 of FIG. 1 is communicably linked to the storage subsystem 610 and the user interface input devices 638.

User interface input devices 638 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 600.

User interface output devices 676 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 600 to the user or to another machine or computer system.

Storage subsystem 610 stores programming and data constructs that provide the functionality of some or all of the modules and methods described herein. Subsystem 678 can be graphics processing units (GPUs) or field-programmable gate arrays (FPGAs).

Memory subsystem 622 used in the storage subsystem 610 can include a number of memories including a main random-access memory (RAM) 632 for storage of instructions and data during program execution and a read only memory (ROM) 634 in which fixed instructions are stored. A file storage subsystem 636 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 636 in the storage subsystem 610, or in other machines accessible by the processor.

Bus subsystem 655 provides a mechanism for letting the various components and subsystems of computer system 600 communicate with each other as intended. Although bus subsystem 655 is shown schematically as a single bus, alternative implementations of the bus subsystem can use multiple busses.

Computer system 600 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 600 depicted in FIG. 6 is intended only as a specific example for purposes of illustrating the preferred embodiments of the present invention. Many other configurations of computer system 600 are possible having more or fewer components than the computer system depicted in FIG. 6.

Particular Implementations

Some implementations and features for tuning containers in pods, in a high availability environment that runs two or more pods to implement a service, while the containers are running, are described in the following discussion.

One implementation discloses a computer-implemented method of tuning containers in pods, in a high availability environment that runs two or more pods to implement a service, while the containers are running, that includes instrumenting a tunable container to communicate application metrics to a tuning engine that runs in a pod and maintains current configuration state information for the tunable container. The disclosed method also includes the tuning engine accessing the application metrics and a rule that specifies tuning of resource configuration for the tunable container. The rule combines a plurality of variables in the application metrics to determine whether a tuning update should be applied to the tunable container. In one example, the rules codify multiple combinations of metrics that result in a call for a tuning update. The tuning engine, responsive to applying the rule, determining a new resource configuration for the tunable container and updating the configuration state information for the tunable container according to the new resource configuration. The disclosed method further includes an update manager detecting updating of the configuration state information and performing a rolling update of instances of the tunable container in the pods that implement the service. The disclosed rolling update occurs automatically without operator intervention in some implementations. One implementation of the disclosed method includes the update manager deploying tunable container instances with updated configuration state information, in pods during the rolling update of instances.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

For some implementations of the disclosed method, instances of the tunable container include a deployment running in containers. In one implementation, a pod includes a set of running containers on a cluster. A deployment can be implemented as a stateful set that manages pods based on an identical container specification.

In one implementation of the disclosed method, the current configuration state information for the tunable container is expressed in a yet another markup language (YAML) file that describes a related set of resources in the high availability environment. In other implementations of the disclosed method, the current configuration state information for the tunable container is expressed in a deployment resource bundle with at least one file that describes a related set of resources for pods in the high availability environment. In one case, the deployment resource bundle is expressed with a Helm chart file that describes a related set of Kubernetes resources.

For some implementations of the disclosed method, the update manager further includes the update manager deploying updated tunable container instances from the updated configuration state information, in pods during the rolling update of instances. For some implementations of the disclosed method, the update manager further includes the update manager, during the rolling update of instances of the tunable container continuing to run a configurable minimum number of instances of the tunable container in the pods and deleting legacy pods that were instantiated from outdated configuration state information.

For some implementations of the disclosed method, the tuning update includes adding an index associated with a field whose count of field lookups occurring during a configurable time period is greater than thirty percent of a total count of field lookups during the configurable time period. In another implementation, the count of field lookups occurring during a configurable time period is greater than fifty percent of the total count of field lookups during the configured time period. The percent of the total count of field lookups can be a configurable value in some implementations.

In one implementation of the disclosed method, the tuning update includes deleting an index associated with a field that has an index and whose count of field lookups occurring during a configurable time period is less than a configurable percent of a total count of field lookups during the configurable time period. In one use case the configurable percent may be five percent of the total count of field lookups during the configurable time period. In another use case, the percentage could be ten percent, fifteen percent or some other value.

For some implementations of the disclosed method, the tuning engine uses persistent storage for maintaining current configuration state information for the tunable container configuration container to avoid loss of state information.

One implementation of the disclosed further includes the tuning engine accessing the application metrics from which phases of operation can be determined and a rule that, based on the determined phase of operation, resets resource configuration of one or more of a cache size, number of concurrent connections, number of work threads in a pool, and number of open files allowed, for the tunable container.

Other implementations of the disclosed technology described in this section can include a tangible non-transitory computer readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A computer-implemented method of tuning of containers in pods, in a high availability environment that runs two or more pods to implement a particular service, while the containers are running, including:
    instrumenting a tunable container to communicate application metrics to a tuning engine that runs in a pod and maintains current configuration state information for the tunable container;
    the tuning engine accessing the application metrics and a rule that specifies tuning of resource configuration for the tunable container, wherein the rule combines a plurality of variables in the application metrics to determine whether a tuning update should be applied to the tunable container;
    the tuning engine, responsive to applying the rule, determining a new resource configuration for the tunable container and updating the configuration state information for the tunable container according to the new resource configuration;
    wherein the new resource configuration updates one or more of a cache size, number of concurrent connections, number of work threads in a pool, and number of open files allowed, for the tunable container; and
    an update manager detecting updating of the configuration state information and performing a rolling update of instances of the tunable container in the pods, while the particular service is running.

2. The computer-implemented method of claim 1, wherein the instances of the tunable container include a deployment running in containers.

3. The computer-implemented method of claim 1, wherein the current configuration state information for the tunable container is expressed in a yet another markup language (abbreviated YAML) file that describes a related set of resources in the high availability environment.

4. The computer-implemented method of claim 1, wherein the current configuration state information for the tunable container is expressed in a deployment resource bundle with at least one file that describes a related set of resources for pods in the high availability environment.

5. The computer-implemented method of claim 1, further including the update manager deploying updated tunable container instances from the updated configuration state information, in pods during the rolling update of instances.

6. The computer-implemented method of claim 1, further including the update manager, during the rolling update of instances of the tunable container:
    continuing to run a configurable minimum number of instances of the tunable container in the pods, and
    deleting legacy pods that were instantiated from outdated configuration state information.

7. The computer-implemented method of claim 1, wherein the tuning update includes adding an index associated with a field whose count of field lookups occurring during a configurable time period is greater than a configurable percent of a total count of field lookups during the configurable time period.

8. The computer-implemented method of claim 1, wherein the tuning update includes deleting an index associated with a field that has an index and whose count of field lookups occurring during a configurable time period is less than a configurable percent of a total count of field lookups during the configurable time period.

9. The computer-implemented method of claim 1, further including the tuning engine accessing the application metrics from which phases of operation can be determined and a rule that, based on the determined phase of operation, resets resource configuration of one or more of a cache size, number of concurrent connections, number of work threads in a pool, and number of open files allowed, for the tunable container.

10. The computer-implemented method of claim 1, wherein the tuning engine uses persistent storage for maintaining current configuration state information for the tunable container to avoid loss of state information.

11. A tangible non-transitory computer readable storage media, including program instructions loaded into memory that, when executed on processors cause the processors to implement a method of tuning of containers in pods, in a high availability environment that runs two or more pods to implement a particular service, while the containers are running, the method including:
    instrumenting a tunable container to communicate application metrics to a tuning engine that runs in a pod and maintains current configuration state information for the tunable container;
    the tuning engine accessing the application metrics and a rule that specifies tuning of resource configuration for the tunable container, wherein the rule combines a plurality of variables in the application metrics to determine whether a tuning update should be applied to the tunable container;
    the tuning engine, responsive to applying the rule, determining a new resource configuration for the tunable container and updating the configuration state information for the tunable container according to the new resource configuration;

wherein the new resource configuration updates one or more of a cache size, number of concurrent connections, number of work threads in a pool, and number of open files allowed, for the tunable container; and an update manager detecting updating of the configuration state information and performing a rolling update of instances of the tunable container in the pods, while the particular service is running.

12. The tangible non-transitory computer readable storage media of claim 11, wherein the instances of the tunable container include a deployment running in containers.

13. The tangible non-transitory computer readable storage media of claim 11, wherein the current configuration state information for the tunable container is expressed in a yet another markup language (abbreviated YAML) file that describes a related set of resources in the high availability environment.

14. The tangible non-transitory computer readable storage media of claim 11, wherein the current configuration state information for the tunable container is expressed in a deployment resource bundle with at least one file that describes a related set of resources for pods in the high availability environment.

15. The tangible non-transitory computer readable storage media of claim 11, further including the update manager, during the rolling update of instances of the tunable container:
   deploying updated tunable container instances from the updated configuration state information,
   continuing to run a configurable minimum number of instances of the tunable container in the pods, and
   deleting legacy pods that were instantiated from outdated configuration state information.

16. The tangible non-transitory computer readable storage media of claim 11, wherein the tuning update includes adding an index associated with a field whose count of field lookups occurring during a configurable time period is greater than a configurable percent of a total count of field lookups during the configurable time period.

17. The tangible non-transitory computer readable storage media of claim 11, wherein the tuning update includes deleting an index associated with a field that has an index and whose count of field lookups occurring during a configurable time period is less than a configurable percent of a total count of field lookups during the configurable time period.

18. A system for tuning containers in pods, in a high availability environment that runs two or more pods to implement a service, while the containers are running, the system including a processor coupled to the non-transitory computer readable storage media and computer instructions of claim 11.

19. The system of claim 18, further including computer instructions implementing the update manager, during the rolling update of instances of the tunable container:
   deploying updated tunable container instances from the updated configuration state information,
   continuing to run a configurable minimum number of instances of the tunable container in the pods, and
   deleting legacy pods that were instantiated from outdated configuration state information.

20. The system of claim 18, wherein the tuning update includes adding an index associated with a field that does not have an index, whose count of field lookups occurring during a configurable time period is greater than a configurable percent of a total count of field lookups during the configurable time period.

* * * * *